United States Patent
Pang et al.

(10) Patent No.: US 9,305,369 B2
(45) Date of Patent: Apr. 5, 2016

(54) METHOD AND SYSTEM FOR DATA COMPRESSION

(71) Applicant: Shenyang Neusoft Medical Systems Co., Ltd., Shenyang (CN)

(72) Inventors: Ling Pang, Shenyang (CN); Wei He, Shenyang (CN)

(73) Assignee: SHENYANG NEUSOFT MEDICAL SYSTEMS CO., LTD., Shenyang (CN)

(*) Notice: Subject to any disclaimer, the term of this patent is extended or adjusted under 35 U.S.C. 154(b) by 18 days.

(21) Appl. No.: 14/142,947

(22) Filed: Dec. 30, 2013

(65) Prior Publication Data

US 2015/0030222 A1 Jan. 29, 2015

(30) Foreign Application Priority Data

Jul. 23, 2013 (CN) .......................... 2013 1 0317464

(51) Int. Cl.
*G06K 9/46* (2006.01)
*G06T 9/00* (2006.01)

(52) U.S. Cl.
CPC .................................... *G06T 9/00* (2013.01)

(58) Field of Classification Search
None
See application file for complete search history.

(56) References Cited

U.S. PATENT DOCUMENTS

| | | | |
|---|---|---|---|
| 5,553,160 A * | 9/1996 | Dawson | G06T 9/005 358/426.02 |
| 2005/0238255 A1 | 10/2005 | Niwa et al. | |
| 2007/0065032 A1 * | 3/2007 | Hernandez | H04N 19/115 382/239 |
| 2009/0046777 A1 | 2/2009 | Kitamura | |

FOREIGN PATENT DOCUMENTS

| | | |
|---|---|---|
| CN | 1666712 A | 9/2005 |
| WO | 03084243 A1 | 10/2003 |

OTHER PUBLICATIONS

The First Office Action issued on Sep. 14, 2015 regarding the Chinese priority patent application (201310317464.0).

* cited by examiner

*Primary Examiner* — Jayesh A Patel
(74) *Attorney, Agent, or Firm* — Kilpatrick Townsend & Stockton LLP (57) ABSTRACT

A method and a system for data compression are provided. The method may include: obtaining scanning data to be compressed; compressing the scanning data using a first compression method and a second compression method to obtain a first compressed data and a second compressed data respectively, where a compression ratio of the first compressed data is lower than a compression ratio of the second compressed data; and determining whether the compression ratio of the first compressed data meets a predetermined compression ratio requirement, if yes, determining the first compressed data as a compression result data corresponding to the scanning data, if no, determining the second compressed data as a compression result data corresponding to the scanning data. Scanning data compressed by the method or the system can meet target compression requirements.

15 Claims, 6 Drawing Sheets

METHOD AND SYSTEM FOR DATA COMPRESSION

CROSS-REFERENCE TO RELATED APPLICATIONS

The present application claims priority to Chinese patent application No. 201310317464.0, filed on Jul. 23, 2013, and entitled "METHOD AND SYSTEM FOR DATA COMPRESSION", the entire disclosure of which is incorporated herein by reference.

TECHNICAL FIELD

The present disclosure generally relates to medical data processing technology, and more particularly, to a method and a system for compressing data of Computed Tomography.

BACKGROUND

Nowadays, in the medical field, Computed Tomography (CT) is used quite widely. CT is a type of medical equipment for performing tomography scan using X-rays, receiving signals using a detector, converting the signals into digital data, inputting the digital data into a computer, and converting the digital data into image.

With an increase of data layers scanned by CT, a volume of data sampled by CT is increasing. Therefore, a large transmission bandwidth and a high transmission speed are required for transmitting the data sampled by CT, which in turn increases data transmission pressure.

Therefore, an efficient method for compressing the CT data is needed to improve data transmission efficiency brought down by large amount of CT sampled data.

SUMMARY

The present disclosure provides a method for data compression to improve data transmission efficiency brought down by large amount of CT sampled data, thus further relieves effect and stress in data transmission.

Another aspect of the present disclosure provides a system for data compression to implement of the spirit of the method, thus ensuring the above method for data compression to be implemented and applied.

Embodiments of the present disclosure provide a method for data compression. According to one embodiment, the method may include: obtaining scanning data to be compressed; compressing the scanning data using a first compression method and a second compression method to obtain a first compressed data and a second compressed data respectively, where a compression ratio of the first compressed data is lower than a compression ratio of the second compressed data; and determining whether the compression ratio of the first compressed data meets a predetermined compression ratio requirement, if yes, determining the first compressed data as a compression result data corresponding to the scanning data, if no, determining the second compressed data as a compression result data corresponding to the scanning data.

Optionally, the method further includes: outputting the compression result data corresponding to the scanning data.

Optionally, compressing the scanning data using a first compression method includes: performing a channel combination on each data of the scanning data along a channel direction according to a combination parameter which does not affect a center scanning area of the scanning data, so as to obtain data after channel combination; performing a difference calculation on the data after channel combination, so as to obtain a result of difference calculation; and performing a lossless coding on the result of difference calculation to obtain the first compressed data.

Optionally, performing a channel combination along a channel direction according to a combination parameter which does not affect a center scanning area of the scanning data includes: selecting, with reference to the combination parameter which does not affect the center scanning area of the scanning data, a predetermined number of channels from both sides of each layer of the scanning data respectively; and combining data of the selected channels.

Optionally, performing a difference calculation on the data after channel combination includes: performing a difference calculation on the data after channel combination along a layer direction, so as to obtain layer difference data; and performing a difference calculation on the layer difference data along the channel direction to obtain a target difference data.

Optionally, performing a lossless coding on the result of difference calculation to obtain a first compression data includes: performing a lossless coding on the target difference data with symbol bits having a first fixed length, length flag bits having a second fixed length, and data bits having a variable length.

Optionally, compressing the scanning data using a second compression method includes: combining the scanning data along two directions of a layer direction and a channel direction according to a target compression ratio, so as to obtain the second compressed data.

Optionally, combining the scanning data along two directions of a layer direction and a channel direction according to a target compression ratio includes: selecting a predetermined number of channels from both sides of each layer of the scanning data according to a target compression ratio; performing a channel combination on data of the selected channels, so as to obtain scanning data after channel combination; and combining the scanning data after channel combination along the layer direction.

According to one embodiment, a method for data compression is provided. The method may include: obtaining scanning data to be compressed; compressing the scanning data using a first compression method to obtain a first compressed data, where compressing the scanning data using the first compression method includes: performing a channel combination on each data of the scanning data along a channel direction according to a combination parameter which does not affect a center scanning area of the scanning data, so as to obtain data after channel combination, performing a difference calculation on the data after channel combination, so as to obtain a result of difference calculation; and performing a lossless coding on the result of difference calculation to obtain the first compressed data; and determining the first compressed data as a compression result data corresponding to the scanning data.

According to one embodiment, a method for data compression is provided. The method may include: obtaining scanning data to be compressed; compressing the scanning data using a second compression method to obtain a second compressed data, where compressing the scanning data using the second compression method includes: combining the scanning data along two directions of a layer direction and a channel direction according to a target compression ratio, so as to obtain the second compressed data; and determining the second compressed data as a compression result data corresponding to the scanning data.

Accordingly, a system for data compression is provided in embodiments of the present disclosure. According to one embodiment, the system may include: an acquisition unit, adapted for obtaining scanning data to be compressed; a first compression unit, adapted for compressing the scanning data using a first compression method to obtain a first compressed data; a second compression unit, adapted for compressing the scanning data using a second compression method to obtain a second compressed data; a first judge unit, adapted for determining whether the compression ratio of the first compressed data meets a predetermined compression ratio requirement; a first determination unit, adapted for, if a determining result of the first judge unit is yes, determining the first compressed data as a compression result data corresponding to the scanning data; and a second determination unit, adapted for, if a determining result of the first judge unit is no, determining the second compressed data as a compression result data corresponding to the scanning data.

Optionally, the system may further include: an output unit, adapted for outputting the compression result data corresponding to the scanning data.

Optionally, the first compression unit includes: a combination sub-unit, adapted for performing a channel combination on each data of the scanning data along a channel direction according to a combination parameter which does not affect a center scanning area of the scanning data, so as to obtain data after channel combination; a difference calculation sub-unit, adapted for performing a difference calculation on the data after channel combination, so as to obtain a result of difference calculation; and a lossless coding sub-unit, adapted for performing a lossless coding on the result of difference calculation to obtain the first compressed data.

Optionally, the combination sub-unit includes: a selection sub-unit, adapted for selecting, with reference to the combination parameter which does not affect the center scanning area of the scanning data, a predetermined number of channels from both sides of each layer of the scanning data respectively; and a channel combination sub-unit, adapted for combining data of the selected channels.

Optionally, the difference calculation sub-unit includes: a channel calculation sub-unit, adapted for performing a difference calculation on the data after channel combination along a layer direction, so as to obtain layer difference data; and a layer calculation sub-unit, adapted for performing a difference calculation on the layer difference data along the channel direction to obtain a target difference data.

Optionally, the lossless coding sub-unit is adapted for performing a lossless coding on the target difference data with symbol bits having a first fixed length, length flag bits having a second fixed length, and data bits having a variable length.

Optionally, the second compression unit is adapted for combining the scanning data along two directions of a layer direction and a channel direction according to a target compression ratio, so as to obtain the second compressed data.

Optionally, the second compression unit includes: a selection sub-unit, adapted for selecting a predetermined number of channels from both sides of each layer of the scanning data according to a target compression ratio; a channel combination sub-unit, adapted for performing a channel combination on data of the selected channels, so as to obtain scanning data after channel combination; and a layer combination sub-unit, adapted for combining the scanning data after channel combination along the layer direction.

According to one embodiment, a system for data compression is provided. The system may include: an acquisition unit, adapted for obtaining scanning data to be compressed; a first compression unit, adapted for compressing the scanning data using a first compression method to obtain a first compressed data, where compressing the scanning data using the first compression method includes: performing a channel combination on each data of the scanning data along a channel direction according to a combination parameter which does not affect a center scanning area of the scanning data, so as to obtain data after channel combination, performing a difference calculation on the data after channel combination, so as to obtain a result of difference calculation; and performing a lossless coding on the result of difference calculation to obtain the first compressed data; and a first determination unit, adapted for determining the first compressed data as a compression result data corresponding to the scanning data.

According to one embodiment, a system for data compression is provided. The system may include: an acquisition unit, adapted for obtaining scanning data to be compressed; a second compression unit, adapted for compressing the scanning data using a second compression method to obtain a second compressed data, where compressing the scanning data using a second compression method includes: combining the scanning data along two directions of a layer direction and a channel direction according to a target compression ratio, so as to obtain the second compressed data; and a second determination unit, adapted for determining the second compressed data as a compression result data corresponding to the scanning data.

According to an embodiment of the present disclosure, the scanning data is compressed using two different compression methods. As such, a final compressed data may use the first compressed data or the second compressed data according to actual compression requirement. Therefore, the method in embodiments of the present disclosure is suitable for scanning data obtained by CT scanning with any dose. Any scanning data compressed by the method can meet target compression requirements. After the compressed data is determined, the compression result data may be output. Thus, a lower amount of compression result data is transmitted, which reduces data transmission pressure. At an end of the data transmission process, the compression result data may be decompressed. Therefore, the cost is reduced and the quality of the scanning data is not affected by the compression.

BRIEF DESCRIPTION OF THE DRAWINGS

In order to clarify embodiments of the present disclosure or the prior art, drawings used in the embodiments of the present disclosure or the prior art are briefly described. It should be understood that, the drawings described below are only embodiments of the present disclosure. Various changes may be made by those skilled in the art, without departing from the spirit or scope of the disclosure.

DETAILED DESCRIPTION

In order to clarify the objects, characteristics and advantages of the disclosure, the embodiments of the present disclosure will be described in detail in conjunction with the accompanying drawings. The disclosure will be described with reference to certain embodiments. It will be understood by those skilled in the art that various changes may be made without departing from the spirit or scope of the disclosure. Accordingly, the present disclosure is not limited to the embodiments disclosed.

Figure 1:
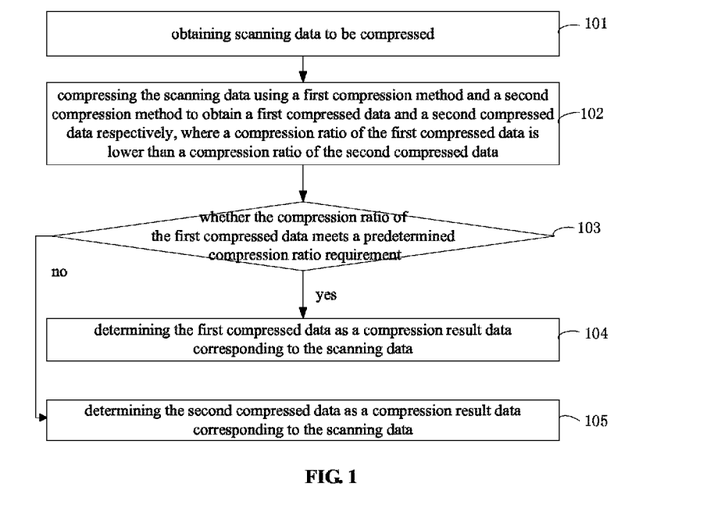
FIG. 1 illustrates a schematic flow chart of a method for data compression according to one embodiment of the present disclosure.

Referring to FIG. 1, a schematic flow chart of a method for data compression is illustrated according to one embodiment of the present disclosure. The method may include steps of 101 to 105.

In step 101, scanning data to be compressed is obtained.

First, a target data to be compressed is obtained, which is a raw data obtained by CT scanning.

In step 102, the scanning data is compressed using a first compression method and a second compression method to obtain a first compressed data and a second compressed data respectively, where a compression ratio of the first compressed data is lower than a compression ratio of the second compressed data.

In one embodiment of the present disclosure, the scanning data to be compressed is compressed with two compression methods, where the compression ratio of the first compression method may be lower than the compression ratio of the second compression method. Therefore, in subsequent processes, after two compressed data are obtained by the two compression methods, one compressed data may be selected according to target requirements.

It should be noted that, compression manners of the first compression method and the second compression method are not limited herein. As long as the compression ratio of the first compression method is lower than the compression ratio of the second compression method.

For better understanding compression methods of the present disclosure, below provides examples of the first compression method and the second compression method.

Figure 2:
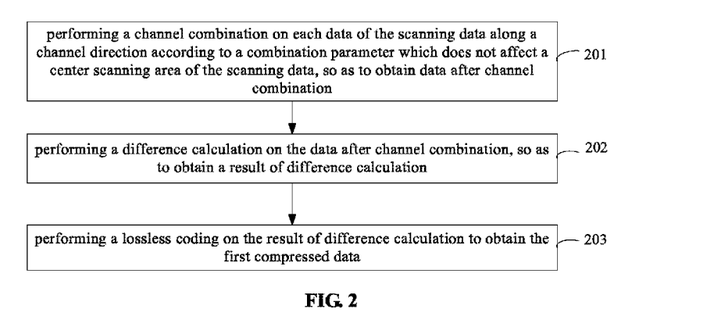
FIG. 2 illustrates a schematic flow chart of a step 102 in the schematic flow chart of FIG. 1 according to one embodiment of the present disclosure.

For example, the scanning data is compressed by the first compression method. Referring to FIG. 2, a schematic flow chart of the first compression method is illustrated. The first compression method may include steps of 201 to 203.

In step 201, a channel combination is performed on each data of the scanning data along a channel direction according to a combination parameter which does not affect a center scanning area of the scanning data, so as to obtain data after channel combination.

Among the raw data obtained by CT scanning, the center scanning area usually contains a large amount of information. In order to avoid an impact on data of the center scanning area which can best reflects the scanning object, the data of the center scanning area does not need to be compressed. Therefore, in one embodiment, a center scanning area of 300FOV (Field Of View) may be predetermined not to be compressed. In some embodiments, other ranges of center scanning area, such as 250FOV, 400FOV, etc, may be predetermined according to actual needs. In one embodiment, there are 64 layers and 672 channels for each image of the raw data. One channel of each layer corresponds to one scanning data. Therefore, each image contains 672*64 scanning data.

In one embodiment, the combining parameter may be selected. For example, a two-in-one channel combination is performed to combine 128 channels of each layer with a weight of 0.5, while 426 center channels of each layer remain unchanged. In this way, 544 channels are obtained in each layer. It should be noted that, in practical applications, those skilled in the art may adopt other weights in the two-in-one channel combination, or adopt a three-in-one channel combination, a three-in-two channel combination or other channel combination methods, which is not limited herein.

Figure 3:
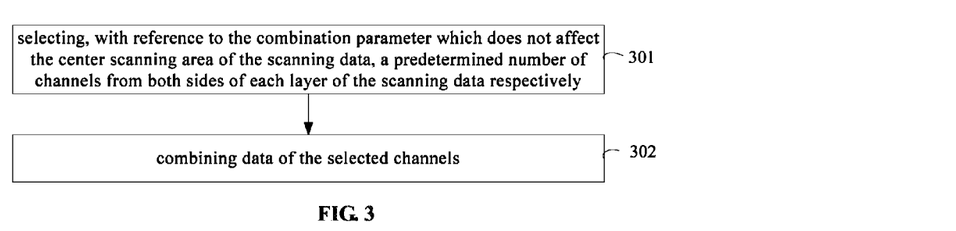
FIG. 3 illustrates a schematic flow chart of a step 201 in the schematic flow chart of FIG. 2 according to one embodiment of the present disclosure.

Specifically, as shown in FIG. 3, a schematic flow chart of the step 201 is illustrated. The step 201 may include step 301 and step 302.

In step 301, with reference to the combination parameter which does not affect the center scanning area of the scanning data, a predetermined number of channels are selected from both sides of each layer of the scanning data respectively.

Taking the combination parameter mentioned above as an example, in this step, 128 channels are selected from each layer side, while 416 channels are not selected from each layer center area. It should be understood that, other numbers of channels may be selected from each layer side in practical applications. The number of channels selected from sides of each layer is not limited in this disclosure.

In step 302, data of the selected channels are combined.

In one embodiment, a two-in-one combination is performed to combine 128 channels of each side of each layer with a weight of 0.5. Namely, data of two channels having a weight of 0.5 are combined into data of one channel. With this, data of 64 channels are obtained from each layer side, and data of 544 channels are obtained for each layer.

Returning to FIG. 2, in step 202, a difference calculation is performed on the data after channel combination, so as to obtain a result of difference calculation.

Figure 4:
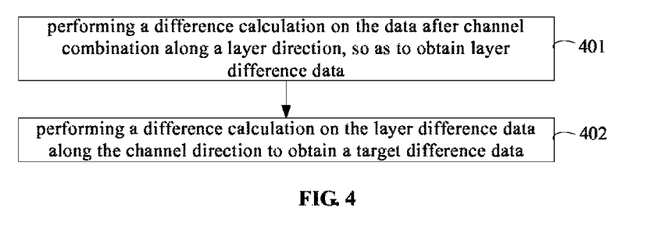
FIG. 4 illustrates a schematic flow chart of a step 202 in the schematic flow chart of FIG. 2 according to one embodiment of the present disclosure.

In one embodiment, after the channel combination is performed, a difference calculation is performed on the data after channel combination. Referring to FIG. 4, the step 202 may include step 401 and step 402.

In step 401, a difference calculation is performed on the data after channel combination along a layer direction, so as to obtain layer difference data.

In one embodiment, the difference calculation is performed on the data of 544 channels along the layer direction to obtain layer difference data. The difference calculation method is not limited herein.

In step 402, a difference calculation is performed on the layer difference data along the channel direction to obtain a target difference data.

Then, the difference calculation is performed on the layer difference data obtained in step 401 to obtain a channel difference data, which forms the target difference data.

Referring to FIG. 2, in step 203, a lossless coding is performed on the result of difference calculation to obtain the first compressed data.

In one embodiment, the lossless coding may be performed on the target difference data to obtain the first compressed data corresponding to the first compression method. The lossless coding may use symbol bits having a first fixed length, length flag bits having a second fixed length, and data bits having a variable length to code the target difference data.

For better understanding the lossless coding, an example of the lossless coding is described below.

In one embodiment, a combination of three parts (1 bit of symbol bit+3 bits of length flag bits+variable length data bits) may be used to represents a variable length lossless code of the target difference data, where the first fixed-length is one bit, and the second fixed-length is three bit. In the process of lossless coding, flag bits (1 bit of symbol bit+3 bits of length flag bits) are in front, and the variable length data bits follow the flag bits. In practical applications, the target difference data may reach 2048. Namely, a length of the target difference data may reach 11 bits. Therefore, when the lossless coding is performed on the target difference data, a length of the data bits may range from 5 bits to 11 bits.

It should be understood that, the length of the data bits is variable. The minimal 5 bits length is obtained from a large number of experimental evaluations. According to the coding rule of 1 bit of symbol bit+3 bits of length flag bits+variable length data bits, if the target difference data is less than pow(2, 5), the target difference data is represented with 5 bits; if the target difference data is greater than pow(2, 11), the target difference data is represented with 16 bits, and the 1 bit of symbol bit is not necessary; if the target difference data is in six partitions between pow(2, 5) and pow(2, 11), the highest bit, which is always 1, may be discarded.

Data codes are shown in Table 1 in detail. Relationships between a size of the target difference data, the flag bits and the data bits are shown in Table 1.

TABLE 1

| size of the target difference data | flag bits (symbol bits + length flag bits) | data bits |
|---|---|---|
| data < pow(2,5) | 4 | 5 |
| pow(2,5) =< data < pow(2,6) | 4 | 5 |
| pow(2,6) =< data < pow(2,7) | 4 | 6 |
| pow(2,7) =< data < pow(2,8) | 4 | 7 |

TABLE 1-continued

| size of the target difference data | flag bits (symbol bits + length flag bits) | data bits |
|---|---|---|
| pow(2,8) =< data < pow(2,9) | 4 | 8 |
| pow(2,9) =< data < pow(2,10) | 4 | 9 |
| pow(2,10) =< data < pow(2,11) | 4 | 10 |
| pow(2,11) =< data | 3 | 16 |

For better understanding the second compression method, the second compression method for compressing the scanning data is described below following embodiments of the first compression method for compressing the scanning data are described.

In one embodiment, the scanning data is compressed using a second compression method, which combines the scanning data along two directions of a layer direction and a channel direction according to a target compression ratio, so as to obtain the second compressed data.

Figure 5:
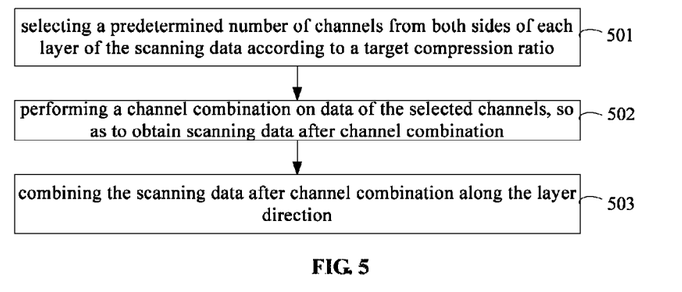
FIG. 5 illustrates a schematic flow chart of a method for combining scanning data along two directions of a layer direction and a channel direction based on a target compression ratio according to one embodiment of the present disclosure.

Referring to FIG. 5, specifically, combining the scanning data along two directions of a layer direction and a channel direction according to a target compression ratio may include steps of 501 to 503.

In step 501, a predetermined number of channels are selected from both sides of each layer of the scanning data according to a target compression ratio.

Assuming the target compression ratio is 2 in one embodiment, because the layer number of each image is 64, and the channel number of each layer is 672, 192 channels are selected from both sides of each layer according to the target compression ratio.

In step 502, a channel combination is performed on data of the selected channels, so as to obtain scanning data after channel combination.

Then, a two-in-one channel combination is performed to combine the 192 channels of both sides of each layer of the scanning data with a weight of 0.5, so as to obtain scanning data after channel combination.

In step 503, the scanning data after channel combination is combined along the layer direction.

Then, a two-in-one combination is performed on the scanning data after channel combination with a weight of 0.5 (It should be noted that channels not involved in channel combination are not combined), while 288 channels in center area of each layer are unchanged. Therefore, a compressed data with a high compression ratio data of 2 is obtained.

It should be understood that, compression methods of the first compression method and the second compression method are not limited to examples mentioned above. For example, the first compression method may be implemented based on a Huffman coding method. Specifically, binary descriptions may be used to replace each symbol, and symbol length may be determined based on frequency of certain symbol, where common symbols are represented by fewer bits, and uncommon symbols are represented by more bits. The second compression method may be implemented base on LZ algorithm. LZ algorithm is a string matching algorithm. For example, a string often appears in a piece of data and can be represented by a string pointer appeared in previous data. There may be three expressions of the string pointer. The first expression is unique flags, the second expression is an offset number, and the third expression is a string length. In some embodiments, other compression methods may be adopted as the first compression method and the second compression method, as long as the compression ratio of the first compression method is lower than the compression ratio of the second compression method.

Referring to FIG. 1, in step 103, determining whether the compression ratio of the first compressed data meets a predetermined compression ratio requirement. If yes, the method goes to step 104; if no, the method goes to step 105.

After the first compressed data with the first compression method and the second compressed data with the second compression method is obtained, determining whether the compression ratio of the first compression method meets the predetermined compression ratio requirement, such as 2, because the compression ratio of the first compression method is lower than the compression ratio of the second compression method.

In step 104, the first compressed data is determined as a compression result data corresponding to the scanning data.

If the compression ratio of the first compressed data meets the predetermined compression ratio requirement, the first compressed data is determined as the compression result data corresponding to the scanning data directly.

In step 105, the second compressed data is determined as a compression result data corresponding to the scanning data.

If the compression ratio of the first compressed data cannot meet the predetermined compression ratio requirement, the second compressed data is determined as the compression result data corresponding to the scanning data.

In one embodiment, the scanning data to be compressed is compressed with two different compression methods. Therefore, it is possible to determine the first compressed data or the second compressed data as a final compressed data according to actual compression requirements. Therefore, the method in embodiments of the present disclosure is suitable for scanning data obtained by CT scanning with any dose, so that any scanning data compressed by the method can meet target compression requirements.

Figure 6:
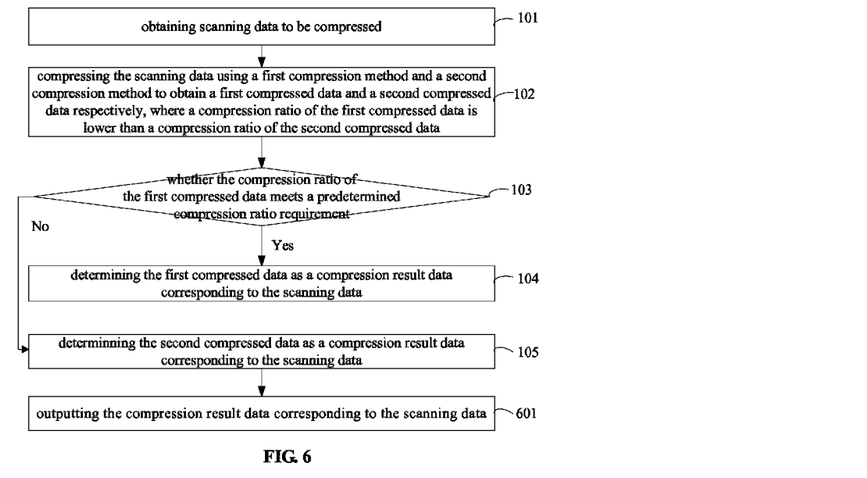
FIG. 6 illustrates a schematic flow chart of a method for data compression according to another embodiment of the present disclosure.

Referring to FIG. 6, in some embodiments, after step 105, the method may further include step 601.

In step 601, the compression result data corresponding to the scanning data is output.

After the compression data is determined, the compression result data may be output. Thus, a low data amount of compressed result data is transmitted, which reduces data transmission pressure. At an end of the data transmission process, the compression result data may be decompressed. Therefore, the cost is reduced and the quality of the scanning data is not affected.

Figure 7:
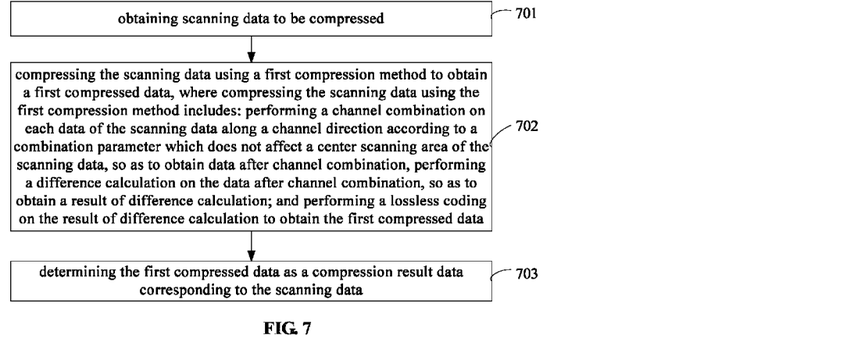
FIG. 7 illustrates a schematic flow chart of a method for data compression according to another embodiment of the present disclosure.

Referring to FIG. 7, a schematic flow chart of a method for data compression is illustrated according to another embodiment of the present disclosure. The method may include steps of 701 to 703.

In step 701, scanning data to be compressed is obtained.

In one embodiment, a raw data to be compressed, which is obtained by CT scanning, is obtained.

In step 702, the scanning data is compressed using a first compression method to obtain a first compressed data, where compressing the scanning data using the first compression method may include: performing a channel combination on each data of the scanning data along a channel direction according to a combination parameter which does not affect a center scanning area of the scanning data, so as to obtain data after channel combination, performing a difference calculation on the data after channel combination, so as to obtain a result of difference calculation; and performing a lossless coding on the result of difference calculation to obtain the first compressed data.

In this step, the first compression method may be used to compress the scanning data. Namely, a channel combination is performed on each data of the scanning data along a channel direction according to a combination parameter which does not affect a center scanning area of the scanning data, so as to obtain data after channel combination; a difference calculation is performed on the data after channel combination, so as to obtain a result of difference calculation; and then a lossless coding is performed on the result of difference calculation to obtain the first compressed data. The specific process of this step can be referred to the embodiment described above, and is not described in detail herein.

In step 703, the first compressed data is determined as a compression result data corresponding to the scanning data.

Finally, the first compressed data obtained by the first compression method is determined as a compression result data corresponding to the scanning data.

Figure 8:
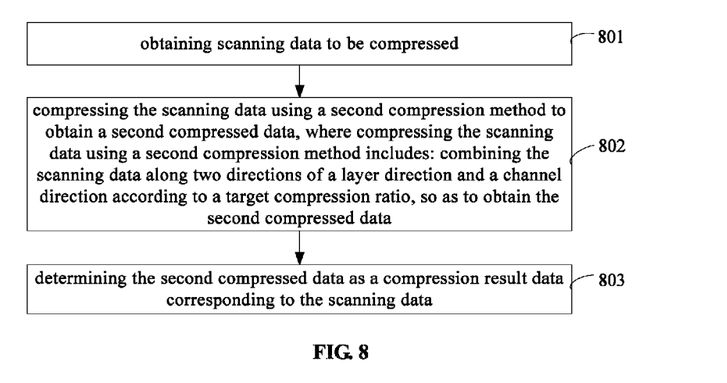
FIG. 8 illustrates a schematic flow chart of a method for data compression according to another embodiment of the present disclosure.

Referring to FIG. 8, a schematic flow chart of a method for data compression is illustrated according to another embodiment of the present disclosure. The method may include steps of 801 to 803.

In step 801, scanning data to be compressed is obtained.

In step 802, the scanning data is compressed using a second compression method to obtain a second compressed data, where compressing the scanning data using a second compression method may include: combining the scanning data along two directions of a layer direction and a channel direction according to a target compression ratio, so as to obtain the second compressed data.

The process of this step may refer to the embodiment described above, and is not described in detail herein.

In step 803, the second compressed data is determined as a compression result data corresponding to the scanning data.

Finally, the second compressed data is determined as a compression result data corresponding to the scanning data.

It will be apparent to those skilled in the art that some or all of the procedures of such methods provided in embodiments of the present disclosure may be performed by some computer programs in response to common hardware platform, or only hardwares. The first mode may be a better implement. The spirit of the present disclosure or the part contributed to the prior art may be reflected in the form of computer programs. The computer programs may be stored in a computer-readable storage medium, which may execute the processes of the methods described in the above embodiments. The storage medium may be an optical disk, a magnetic disk, a Read-Only Memory (ROM), or a Random Access Memory (RAM), etc.

Figure 9:
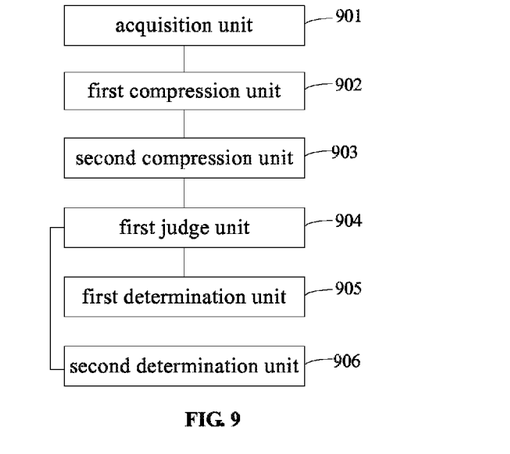
FIG. 9 illustrates a schematic structural diagram of a system for data compression according to one embodiment of the present disclosure.

Corresponding to the method described above, a system for data compression is provided in embodiments of the present disclosure. Referring to FIG. 9, a schematic structural diagram of a system for data compression is illustrated according to one embodiment of the present disclosure. The system may include an acquisition unit 901, a first compression unit 902, a second compression unit 903, a first judge unit 904, a first determination unit 905 and a second determination unit 906.

The acquisition unit 901 is adapted for obtaining scanning data to be compressed.

The first compression unit 902 is adapted for compressing the scanning data using a first compression method to obtain a first compressed data.

Figure 10:
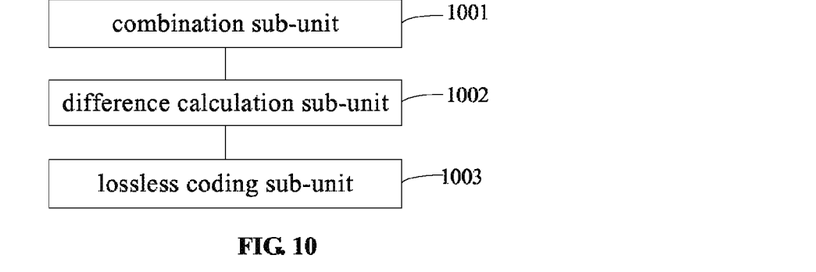
FIG. 10 illustrates a schematic structural diagram of a first compression unit 902 in the schematic structural diagram of FIG. 9 according to one embodiment of the present disclosure.

Referring to FIG. 10, the first compression unit 902 may include a combination sub-unit 1001, a difference calculation sub-unit 1002, and a lossless coding sub-unit 1003

The combination sub-unit 1001 is adapted for performing a channel combination on each data of the scanning data along a channel direction according to a combination parameter which does not affect a center scanning area of the scanning data, so as to obtain data after channel combination.

Figure 11:
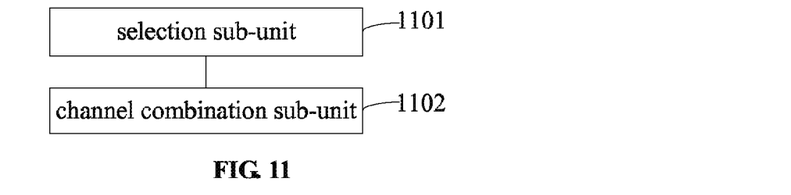
FIG. 11 illustrates a schematic structural diagram of a combination sub-unit 1001 in the schematic structural diagram of FIG. 10 according to one embodiment of the present disclosure.

Referring to FIG. 11, the combination sub-unit 1001 may include a selection sub-unit 1101 and a channel combination sub-unit 1102.

The selection sub-unit 1101 is adapted for selecting, with reference to the combination parameter which does not affect the center scanning area of the scanning data, a predetermined number of channels from both sides of each layer of the scanning data respectively.

The channel combination sub-unit 1102 is adapted for combining data of the selected channels.

The difference calculation sub-unit 1002 is adapted for performing a difference calculation on the data after channel combination, so as to obtain a result of difference calculation.

Figure 12:
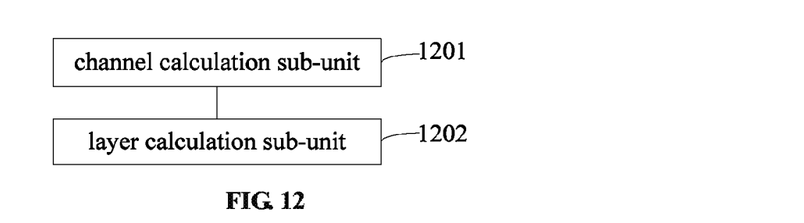
FIG. 12 illustrates a schematic structural diagram of a difference calculation sub-unit 1002 in the schematic structural diagram of FIG. 10 according to one embodiment of the present disclosure.

Referring to FIG. 12, the difference calculation sub-unit 1002 may include a channel calculation sub-unit 1201 and a layer calculation sub-unit 1202.

The channel calculation sub-unit 1201 is adapted for performing a difference calculation on the data after channel combination along a layer direction, so as to obtain layer difference data.

The layer calculation sub-unit 1202 is adapted for performing a difference calculation on the layer difference data along the channel direction to obtain a target difference data.

The lossless coding sub-unit 1003 is adapted for performing a lossless coding on the result of difference calculation to obtain the first compressed data.

In one embodiment, the lossless coding sub-unit 1003 may be used to perform a lossless coding on the target difference data using symbol bits having a first fixed length, length flag bits having a second fixed length, and data bits having a variable length.

The second compression unit 903 is adapted for compressing the scanning data using a second compression method to obtain a second compressed data.

In one embodiment, the second compression unit 903 may be used to combine the scanning data along two directions of a layer direction and a channel direction according to a target compression ratio, so as to obtain the second compressed data.

Figure 13:
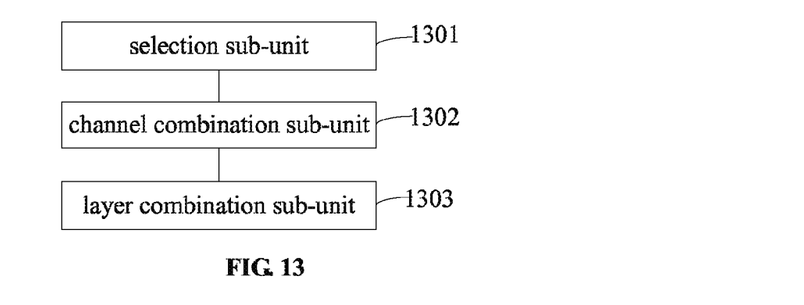
FIG. 13 illustrates a schematic structural diagram of a second compression unit 903 in the schematic structural diagram of FIG. 9 according to one embodiment of the present disclosure.

Referring to FIG. 13, the second compression unit 903 may include a selection sub-unit 1301, a channel combination sub-unit 1302 and a layer combination sub-unit 1303.

The selection sub-unit 1301 is adapted for selecting a predetermined number of channels from both sides of each layer of the scanning data according to a target compression ratio.

The channel combination sub-unit 1302 is adapted for performing a channel combination on data of the selected channels, so as to obtain scanning data after channel combination.

The layer combination sub-unit 1303 is adapted for combining the scanning data after channel combination along the layer direction.

The first judge unit 904 is adapted for determining whether the compression ratio of the first compressed data meets a predetermined compression ratio requirement.

The first determination unit 905 is adapted for, determining the first compressed data as a compression result data corresponding to the scanning data if a determining result of the first judge unit is yes.

The second determination unit 906 is adapted for, if a determining result of the first judge unit is no, determining the second compressed data as a compression result data corresponding to the scanning data.

In one embodiment, the scanning data is compressed with two different compression methods. As such, a final compressed data may use the first compressed data or the second compressed data according to actual compression requirement. Therefore, the system in embodiments of the present disclosure is suitable for scanning data obtained by CT scanning with any dose. Any scanning data compressed by the system can meet target compression requirements.

Figure 14:
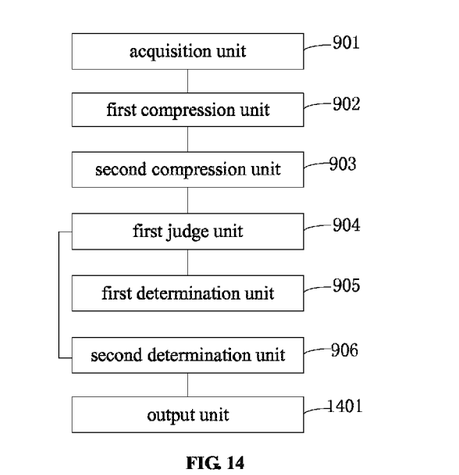
FIG. 14 illustrates a schematic structural diagram of a system for data compression according to another embodiment of the present disclosure.

Referring to FIG. 14, in addition to units shown in FIG. 9, the system of the present disclosure may further include an output unit 1401.

The output unit 1401 is adapted for outputting the compression result data corresponding to the scanning data.

After the compressed data is determined, the compression result data may be output. Thus, a lower amount of compression result data is transmitted, which reduces data transmission pressure. At an end of the data transmission process, the compression result data may be decompressed. Therefore, the cost is reduced and the quality of the scanning data is not affected.

Figure 15:
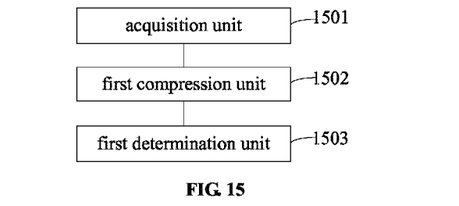
FIG. 15 illustrates a schematic structural diagram of a system for data compression according to another embodiment of the present disclosure.

Referring to FIG. 15, a schematic structural diagram of a system for data compression is illustrated according to another embodiment of the present disclosure. The system may include an acquisition unit 1501, a first compression unit 1502, and a first determination unit 1503.

The acquisition unit 1501 is adapted for obtaining scanning data to be compressed.

The first compression unit 1502 is adapted for compressing the scanning data using a first compression method to obtain a first compressed data, where compressing the scanning data using the first compression method may include: performing a channel combination on each data of the scanning data along a channel direction according to a combination parameter which does not affect a center scanning area of the scanning data, so as to obtain data after channel combination, performing a difference calculation on the data after channel combination, so as to obtain a result of difference calculation; and performing a lossless coding on the result of difference calculation to obtain the first compressed data.

The first determination unit 1503 is adapted for determining the first compressed data as a compression result data corresponding to the scanning data.

Figure 16:
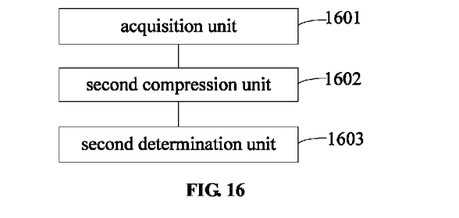
FIG. 16 illustrates a schematic structural diagram of a system for data compression according to another embodiment of the present disclosure.

Referring to FIG. 16, a schematic structural diagram of a system for data compression is illustrated according to another embodiment of the present disclosure. The system may include an acquisition unit 1601, a second compression unit 1602 and a second determination unit 1603.

The acquisition unit 1601 is adapted for obtaining scanning data to be compressed.

The second compression unit 1602 is adapted for compressing the scanning data using a second compression method to obtain a second compressed data, where compressing the scanning data using a second compression method may include: combining the scanning data along two directions of a layer direction and a channel direction according to a target compression ratio, so as to obtain the second compressed data.

The second determination unit 1603 is adapted for determining the second compressed data as a compression result data corresponding to the scanning data.

It should be understood that, the methods and systems of the present disclosure can be used in general or special purpose computing systems or configurations, such as personal computers, server computers, hand-held devices, portable devices, tablet devices, multiprocessor systems, microprocessor-based systems, set-top boxes, programmable consumer electronic devices, network PC, minicomputers, mainframe computers, or distributed computing systems which include any systems or devices thereof.

The methods and systems of the present disclosure may be described in computer executable instructions, such as program modules. Generally, the program modules may include routines, programs, objects, components, data structures, etc, which are used for performing certain tasks or implementing certain abstract data types. The methods and systems of the present disclosure may be also implemented in distributed computing systems. In these distributed computing systems, remote processing devices which are connected by communication networks are used to execute tasks. In the distributed computing systems, program modules may be stored in storage media, such as storage devices, of local or remote computers.

It should be noted that, the terms "first", "second", and the like in the description and in the claims, are used for distinguishing between similar elements and not tend to describe a particular sequential and chronological order. Furthermore, the terms "comprise", "include" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus. Similarly, the term "include a" or "comprise a" does not necessarily exclude that a process, method, article, or apparatus may include same other elements.

Since the system embodiments are basically corresponding to the method embodiments, relevant parts of the system can refer to the method embodiments. The system is described with reference to certain embodiments in this disclosure. Units which are described as separated components may or may not be physically separated. Components described as units may or may not be physical units, that is, they may be disposed on a same place or distributed in a plurality of network cells. The purpose of the present disclosure may be realized by selecting some or all of the units according to practical requirements. Embodiments of the present disclosure can be understood and implemented by those skilled in the art without departing from the spirit or scope of the disclosure.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A method for data compression, comprising:
obtaining scanning data to be compressed;
compressing the scanning data using a first compression method and a second compression method to obtain a first compressed data and a second compressed data respectively, where a compression ratio of the first compressed data is lower than a compression ratio of the second compressed data; and
determining whether the compression ratio of the first compressed data meets a predetermined compression ratio requirement, if yes, determining the first compressed data as a compression result data corresponding to the scanning data, if no, determining the second compressed data as a compression result data corresponding to the scanning data,
wherein compressing the scanning data using a first compression method comprises:
performing a channel combination on each data of the scanning data along a channel direction according to a combination parameter which does not affect a center scanning area of the scanning data, so as to obtain data after channel combination;
performing a difference calculation on the data after channel combination, so as to obtain a result of difference calculation; and
performing a lossless coding on the result of difference calculation to obtain the first compressed data.

2. The method according to claim 1, further comprising: outputting the compression result data corresponding to the scanning data.

3. The method according to claim 1, wherein performing a channel combination along a channel direction according to a combination parameter which does not affect a center scanning area of the scanning data comprises:
selecting, with reference to the combination parameter which does not affect the center scanning area of the scanning data, a predetermined number of channels from both sides of each layer of the scanning data respectively; and
combining data of the selected channels.

4. The method according to claim 1, wherein performing a difference calculation on the data after channel combination comprises:
performing a difference calculation on the data after channel combination along a layer direction, so as to obtain layer difference data; and
performing a difference calculation on the layer difference data along the channel direction to obtain a target difference data.

5. The method according to claim 4, wherein performing a lossless coding on the result of difference calculation to obtain a first compression data comprises: performing a lossless coding on the target difference data with symbol bits having a first fixed length, length flag bits having a second fixed length, and data bits having a variable length.

6. The method according to claim 1, wherein compressing the scanning data using a second compression method comprises: combining the scanning data along two directions of a layer direction and a channel direction according to a target compression ratio, so as to obtain the second compressed data.

7. The method according to claim 6, wherein combining the scanning data along two directions of a layer direction and a channel direction according to a target compression ratio comprises:
selecting a predetermined number of channels from both sides of each layer of the scanning data according to a target compression ratio;
performing a channel combination on data of the selected channels, so as to obtain scanning data after channel combination; and
combining the scanning data after channel combination along the layer direction.

8. A method for data compression, comprising:
obtaining scanning data to be compressed;
compressing the scanning data using a first compression method to obtain a first compressed data, where compressing the scanning data using the first compression method comprises: performing a channel combination on each data of the scanning data along a channel direction according to a combination parameter which does not affect a center scanning area of the scanning data, so as to obtain data after channel combination, performing a difference calculation on the data after channel combination, so as to obtain a result of difference calculation; and performing a lossless coding on the result of difference calculation to obtain the first compressed data; and determining the first compressed data as a compression result data corresponding to the scanning data.

9. A system for data compression, comprising: one or more processors configured to:
obtain scanning data to be compressed;
compress the scanning data using a first compression method to obtain a first compressed data;
compress the scanning data using a second compression method to obtain a second compressed data;
determine whether the compression ratio of the first compressed data meets a predetermined compression ratio requirement;
if the compression ratio of the first compressed data meets a predetermined compression ratio requirement, determine the first compressed data as a compression result data corresponding to the scanning data; and
if the compression ratio of the first compressed data doesn't meet the predetermined compression ratio requirement, determine the second compressed data as a compression result data corresponding to the scanning data,
wherein, in a process for compressing the scanning data using a first compression method to obtain a first compressed data, the one or more processors are further configured to:
perform a channel combination on each data of the scanning data along a channel direction according to a combination parameter which does not affect a center scanning area of the scanning data, so as to obtain data after channel combination;
perform a difference calculation on the data after channel combination, so as to obtain a result of difference calculation; and
perform a lossless coding on the result of difference calculation to obtain the first compressed data.

10. The system according to claim 9, wherein the one or more processors are further configured to: output the compression result data corresponding to the scanning data.

11. The system according to claim 9, wherein the one or more processors are further configured to:
select, with reference to the combination parameter which does not affect the center scanning area of the scanning data, a predetermined number of channels from both sides of each layer of the scanning data respectively; and
combine data of the selected channels.

12. The system according to claim 9, wherein the one or more processors are further configured to:
perform a difference calculation on the data after channel combination along a layer direction, so as to obtain layer difference data; and
perform a difference calculation on the layer difference data along the channel direction to obtain a target difference data.

13. The system according to claim 12, wherein the one or more processors are further configured to perform a lossless coding on the target difference data with symbol bits having a first fixed length, length flag bits having a second fixed length, and data bits having a variable length.

14. The system according to claim 9, wherein the one or more processors are further configured to combine the scanning data along two directions of a layer direction and a channel direction according to a target compression ratio, so as to obtain the second compressed data.

15. The system according to claim 14, wherein the one or more processors are further configured to:
select a predetermined number of channels from both sides of each layer of the scanning data according to a target compression ratio;
perform a channel combination on data of the selected channels, so as to obtain scanning data after channel combination; and
combine the scanning data after channel combination along the layer direction.

* * * * *